United States Patent [19]
Lassanske et al.

[11] Patent Number: 6,062,451
[45] Date of Patent: May 16, 2000

[54] PIVOT STOP BICYCLE RACK

[75] Inventors: Todd W. Lassanske, Ridgeway; John M. Bloemer, Madison, both of Wis.

[73] Assignee: Graber Products, Inc., Madison, Wis.

[21] Appl. No.: 09/298,666

[22] Filed: Apr. 23, 1999

Related U.S. Application Data

[63] Continuation-in-part of application No. 09/115,979, Jul. 15, 1998.

[51] Int. Cl.[7] .................................................... B60R 9/00
[52] U.S. Cl. ......................... 224/502; 224/503; 224/504; 224/505; 224/506; 224/507; 224/509; 224/518; 224/519
[58] Field of Search .................................. 229/521, 502, 229/503–507, 509, 511, 518, 519, 525, 533, 537

[56] References Cited

U.S. PATENT DOCUMENTS

| | | |
|---|---|---|
| 995,771 | 6/1911 | Coyle . |
| 1,135,517 | 4/1915 | Goss . |
| 1,860,920 | 5/1932 | Barker . |
| 1,886,911 | 11/1932 | Schulman . |
| 1,912,958 | 6/1933 | Widener . |
| 1,979,809 | 11/1934 | Newton . |
| 2,512,267 | 6/1950 | Donnelley . |
| 3,202,332 | 8/1965 | Walker . |
| 3,350,065 | 10/1967 | Mankey . |
| 3,529,737 | 9/1970 | Daugherty . |
| 4,976,386 | 12/1990 | Geiger . |
| 5,094,373 | 3/1992 | Lovci . |
| 5,114,120 | 5/1992 | Bartelt et al. . |
| 5,190,195 | 3/1993 | Fulhart et al. . |
| 5,303,857 | 4/1994 | Hewson . |
| 5,454,496 | 10/1995 | Sumida et al. . |
| 5,518,159 | 5/1996 | DeGuevara . |
| 5,586,702 | 12/1996 | Sadler . |
| 5,626,059 | 5/1997 | Bobbitt, III et al. . |
| 5,664,717 | 9/1997 | Joder . |
| 5,775,555 | 7/1998 | Bloemer et al. .................. 224/531 |
| 5,884,826 | 3/1999 | Shaver ................................ 224/509 |

OTHER PUBLICATIONS

"Quik Hitch™ #T–QH4000: Multi–Fit 2 & 4 Bike Trailer Hitch Systems" brochure, Bard Wyers Sports, Inc.
"T–REX Raks Easy to Use Built to Last", advertisement.
Slider Corp. Product Guide 1994, Slider Corp.
Swagman, advertisement, Danik Industries Ltd., British Columbia, Canada.
1995 Rhode Gear catalog, 1994 Rhode Gear.
"Piper Bike Racks Unsurpassed Stability", advertisement, King Roof, Inc., Taiwan.
Rak N Loc, "Keep Your Bikes Absolutely Safe", advertisement, B&S Enterprises.

*Primary Examiner*—Gregory M. Vidovich
*Assistant Examiner*—Maerena W. Brevard
*Attorney, Agent, or Firm*—Lathrop & Clark LLP

[57] ABSTRACT

A formed steel tilt bracket has a cylindrical section which wraps around a bike support tube forming a visually pleasing and cost-effective solution to the problem of joining a round tube with a square hitch extension. The tilt bracket engages and supports an upstanding circular tube for mounting bicycles or the like. The bracket has a plane of symmetry aligned with the rectangular hitch extension. The plane of symmetry passes through a cylindrical portion of the bracket which is intersected only once by the plane of symmetry, the cylindrical portion wraps over 180 degrees of the upstanding tube circumference. The cylindrical portion has a first substantially triangular extension and a second substantially triangular extension arranged symmetrically about the plane of symmetry and forming therebetween a passage for the square receiver tube. The bracket is pivotally mounted to the square receiver tube by a first pin passing through the first substantially triangular extension, the rectangular tub extension, and the second substantially triangular extension, the pin being closely spaced from the cylindrical portion. A second pin is readily removed and inserted and is positioned spaced towards the trailer hitch to connect the triangular extensions and the rectangular hitch extension. A stop is mounted to a lowermost portion of each of the triangular extensions to limit the rearward pivoting of the bracket on the rectangular extension to about 45 degrees.

9 Claims, 5 Drawing Sheets

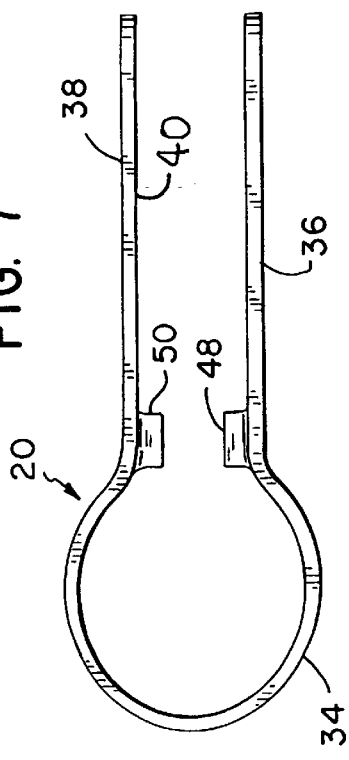
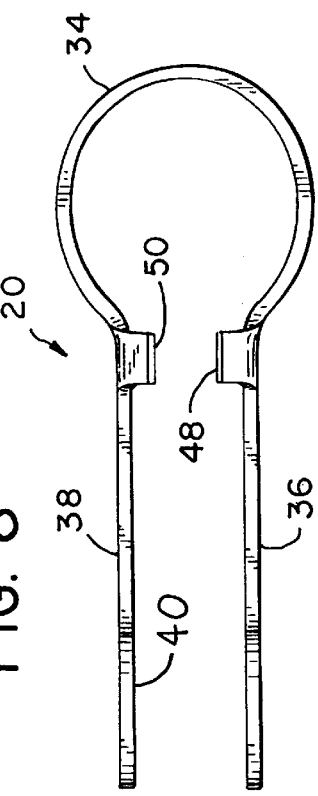
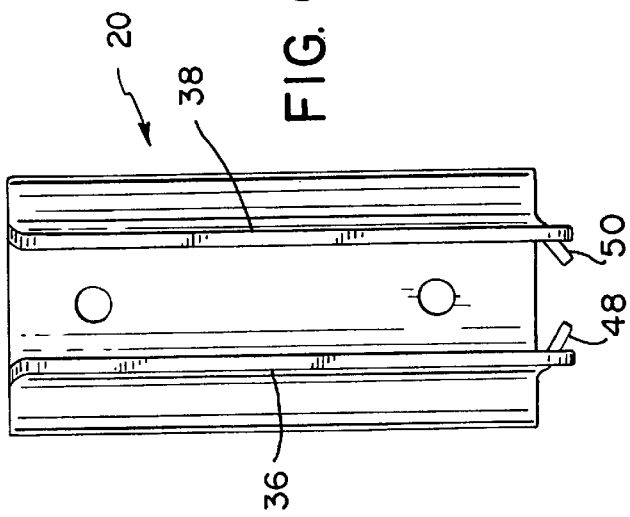
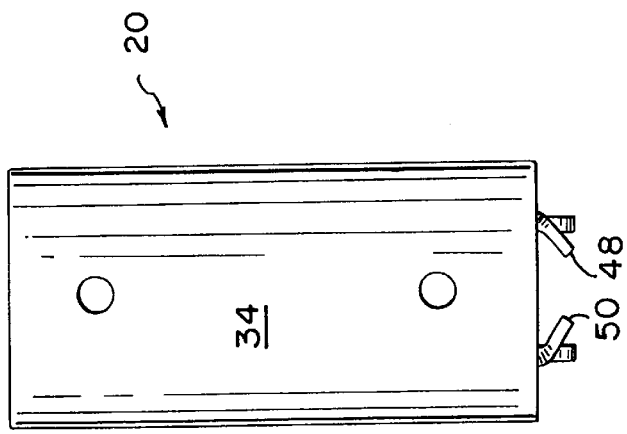

PIVOT STOP BICYCLE RACK

CROSS REFERENCES TO RELATED APPLICATIONS

This application is a continuation-in-part of application Ser. No. 09/115,979, filed Jul. 15, 1998, the disclosure of which is incorporated by reference herein.

STATEMENT AS TO RIGHTS TO INVENTIONS MADE UNDER FEDERALLY SPONSORED RESEARCH AND DEVELOPMENT

BACKGROUND OF THE INVENTION

The present invention relates to bicycle racks in general and bicycle racks which are attached to a rear mounted hitch in particular.

With the ever increasing popularity of trucks, mini-vans, and sports utility vehicles, many production passenger vehicles come equipped with a rear facing trailer hitch. The prevalence of rear facing trailer hitches has increased the popularity of bicycle racks which mount to a rear facing trailer hitch. A bicycle rack which mounts to a trailer hitch does not engage any part of the vehicle on which a high gloss appearance finish is applied. Thus, for the consumer, a bicycle rack which mounts to a structure designed to carry loads is often perceived as desirable. Mounting behind the vehicle also cuts down on wind resistance and provides for easy access to bikes mounted on a bike rack.

Many vehicular bike racks have been designed with a short square tube, called a receiver tube, which mounts with a receiver hitch. The square tube is mated to a bracket which holds a round tube which extends upwardly about three feet and is bent to form a rearwardly facing arm on which bikes are supported.

In the past, to simplify connecting a round tube to a square bracket, the base of the tube has been formed into a rectangular member which mates with a bracket. The bracket typically provides for tilting the tube and bike support arm rearwardly to allow the consumer to gain access to the rear of the vehicle.

What is needed is a bracket for connecting a round tube at approximately right angles to a square hitch extension tube.

SUMMARY OF THE INVENTION

The bracket of this invention provides a formed steel tilt bracket which has a cylindrical section which wraps around a bike support tube forming a visually pleasing and cost effective solution to the problem of joining a round tube with a square hitch extension. The tilt bracket is adapted to engage and support an upstanding circular tube for mounting bicycles or the like. The bracket has a plane of symmetry aligned with the square hitch extension. The plane of symmetry passes through a cylindrical portion of the bracket which is intersected only once by the plane of symmetry, the cylindrical portion wrapping over 180 degrees of the upstanding tube circumference. The cylindrical portion has a first substantially triangular extension and a second substantially triangular extension arranged symmetrically about the plane of symmetry and forming therebetween a passage for the square receiver tube. The bracket is pivotally mounted to the square receiver tube by a first pin which extends through the first substantially triangular extension, the rectangular tube extension, and the second substantially triangular extension. This pin is closely spaced from the cylindrical portion. A second pin is adapted to be readily removed and inserted and is positioned spaced towards the trailer hitch. The second pin connects the triangular extensions to the square receiver tube to selectably prevent pivoting. A stop is mounted to a lowermost portion of each of the triangular extensions to limit the rearward pivoting of the bracket on the rectangular extension to about 45 degrees.

It is an object of the present invention to provide a tilt bracket for supporting a bicycle rack which directly engages a round tubular support.

It is a further object of the present invention to provide cost savings in mounting a round tubular member to a receiver hitch.

It is another object of the present invention to provide a mounting bracket of increased strength between a rectangular receiver tube and a vertical circular tubular member to which bikes are mounted.

Further objects, features and advantages of the invention will be apparent from the following detailed description when taken in conjunction with the accompanying drawings.

BRIEF DESCRIPTION OF THE DRAWINGS

FIG. 5 is a rear elevational view of the support bracket of FIG. 1.

FIG. 6 is a front elevational view of the support bracket of FIG. 1.

FIG. 7 is a top plan view of the support bracket of FIG. 1.

FIG. 8 is a bottom plan view of the support bracket of FIG. 1.

DESCRIPTION OF THE PREFERRED EMBODIMENTS

Figures 1, 2:
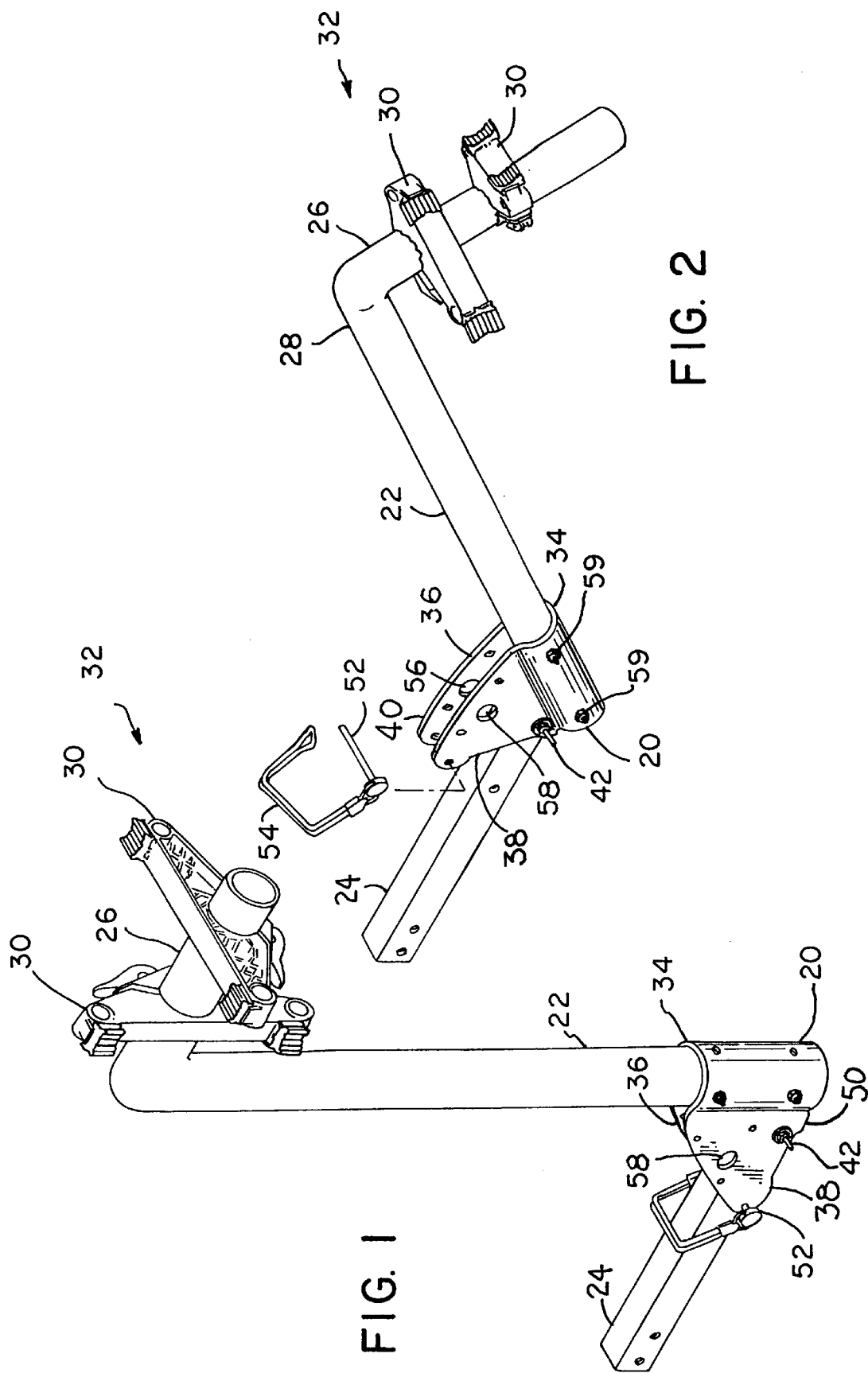
FIG. 1 is an isometric view of the support bracket of this invention shown supporting a tubular upright on a square hitch extension.
FIG. 2 is an isometric view of the support bracket of FIG. 1 shown in a rearwardly tilted position as held by bracket stops.
Figure 3:
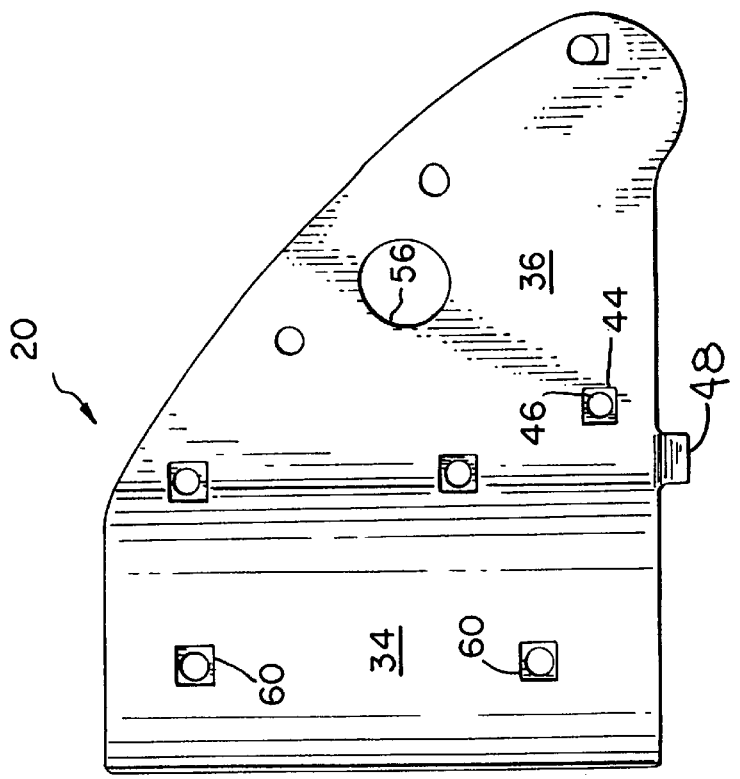
FIG. 3 is a right side elevational view of the support bracket of FIG. 1.
Figure 4:
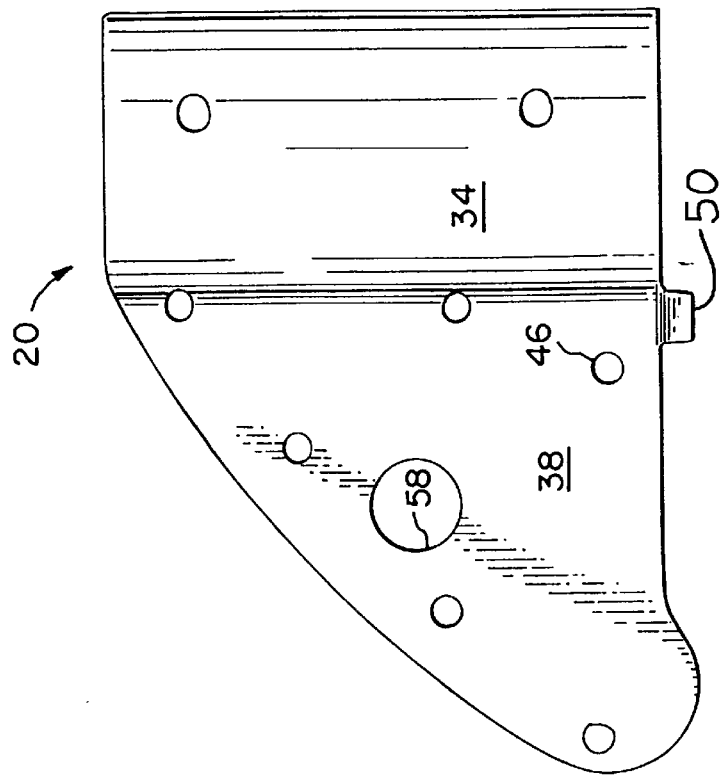
FIG. 4 is a left side elevational view of the support bracket of FIG. 1.
Figure 10:
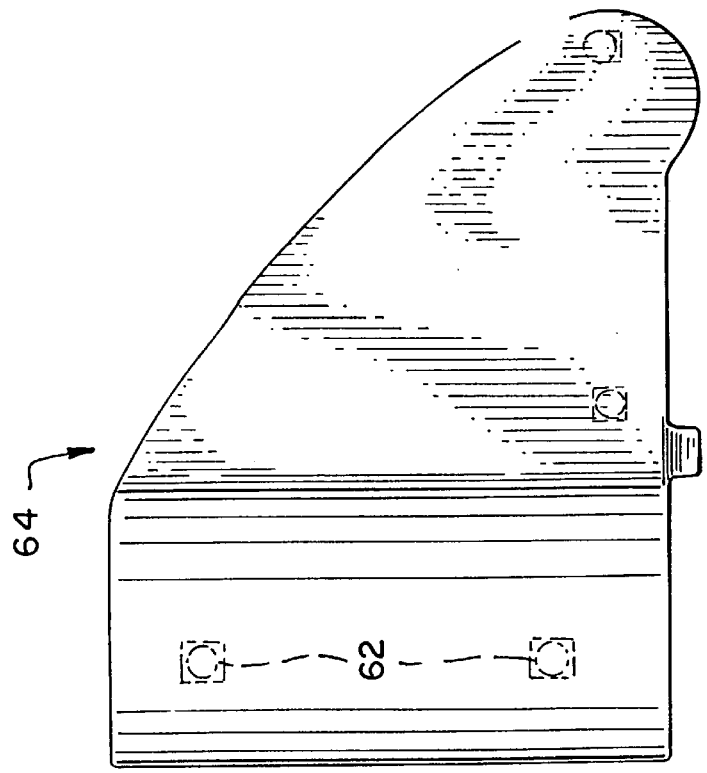
FIG. 10 is a right side elevational view of the support bracket of FIG. 9.
Figure 9:
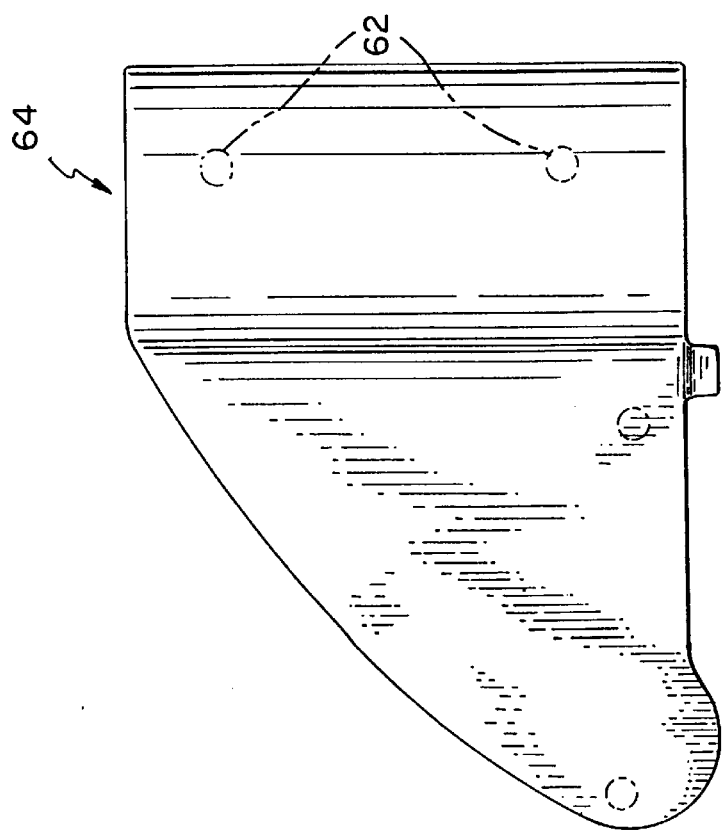
FIG. 9 is a left side elevational view of an alternative embodiment of the support bracket of this invention.
Figure 12:
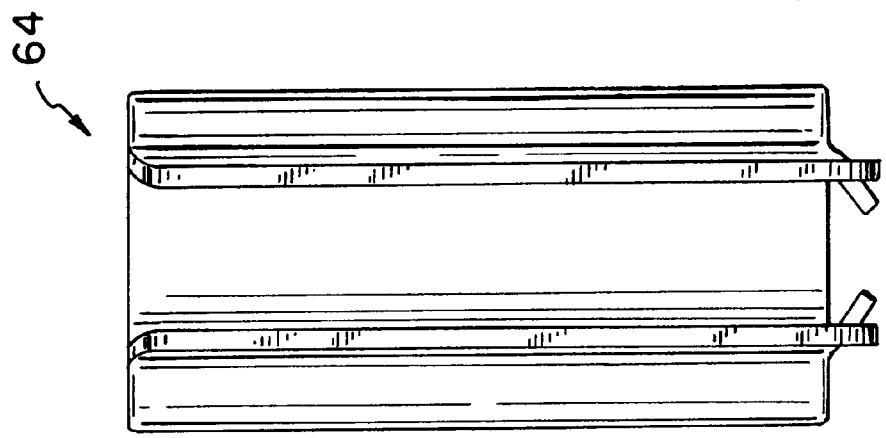
FIG. 12 is a front elevational view of the support bracket of FIG. 9.
Figure 11:
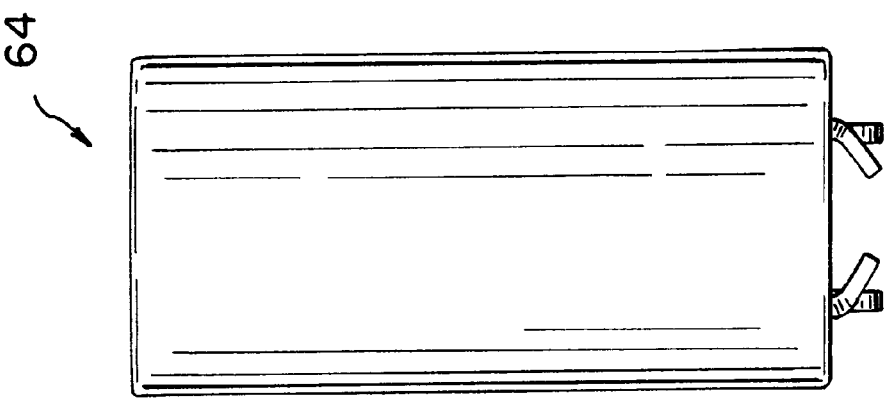
FIG. 11 is a rear elevational view of the support bracket of FIG. 9.

Referring more particularly to FIGS. 1–12, wherein like numbers refer to similar parts, a bracket 20 is shown. The bracket 20 connects a right cylindrical tube 22 to a rectangular extension 24 which mates with a square hitch (not shown), which extends from the rear of a vehicle (not shown). The bracket 20 provides a rigid connection between the cylindrical tube 22 and the rectangular extension 24, yet also provides a rear tilt function when needed, as shown in FIG. 2.

An arm 26 for supporting bicycles extends rearwardly from the top 28 of the cylindrical tube 22. The bicycles (not shown) are mounted by adjustable tilt brackets 30 which are described more fully in U.S. Pat. No. 5,775,555, which is incorporated herein by reference. A bike rack 32 is formed by the bracket 20, the cylindrical tube 22, the rearwardly extending arm 26, and the tilt brackets 30 mounted thereon. Rearward tilting of the bracket 20 provides access to the rear of the vehicle (not shown) to which the bike rack 32 is mounted.

The bracket 20 is symmetric about a rearwardly extending vertical plane which bisects the rectangular tube extension 24. This symmetry is clearly shown in FIGS. 7 and 8. The bracket 20 has a cylindrical portion 34 which intersects the plane of symmetry only once. The cylindrical portion 34 wraps around approximately 300 degrees of the circumference of the vertical tube. The cylindrical portion 34 is joined to a first substantially triangular extension 36 and a second substantially triangular portion 38 arranged symmetrically about the plane of symmetry. The substantially triangular extensions 36, 38 are arranged in spaced parallel relation and form therebetween a passage 40 for the rectangular extension 24.

The bracket 20 is pivotally mounted to the rectangular extension 24 by a first pin 42 which extends through the first substantially triangular extension 36, the rectangular tube extension 24, and the second substantially triangular extension 38, as shown in FIG. 2. The pin 42 passes through a square hole 44, best shown in FIG. 3, which is closely spaced from the cylindrical portion 34, then through holes (not shown) in the rectangular extension 24 and finally through a round hole 46, shown in FIG. 4. The pin 42 may be a carriage bolt which is gripped within a square hole 44, thus allowing a nut (not shown) to be tightened.

A first stop 48 is co-formed with the first triangular extension 36 and a second stop 50 is co-formed with the second triangular extension 38. Each stop may be formed as a rectangle of metal which extends inwardly at approximately a 90 degree angle from the plane of the triangular extension from which it extends. The first and second stops 48, 50 cooperate to limit the rearward tilt of the bracket 20 and the cylindrical tube 22 to about forty-five degrees. The stops 48, 50 are positioned between the hole 44 and the cylindrical portion 34 and between the hole 46 and the cylindrical portion 34.

A removable second pin 52 releasably fixes the first and second substantially triangular extensions 36, 38 to the rectangular extension 24 at a position spaced from the first pin 42. The second pin 52, as shown in FIG. 2, has a spring loaded bail 54 which positively locks the pin 52 in place. When it is desired to access the interior of the vehicle through the vehicle rear, the second pin 52 is removed, and the cylindrical tube 22 is pivoted rearwardly. The stops 48, 50 will engage with the underside of the rectangular tube extension to prevent the tube from pivoting so far rearwardly that the bicycles or the tube 22 will engage the ground.

The bracket 20 provides an elegant structural link between the vertical cylindrical tube 22 and the rectangular extension 24 which mounts to a square trailer hitch (not shown). The triangular extensions 36, 38 provide structural gussets which provide a rigid structure for mounting the tube 22 to the rectangular extension 24. The triangular extensions 36, 38 also provide openings 56, 58 through which a locking cable or the like may be passed to lock bikes to the bracket 20.

The bracket 20 is attached to the vertical cylindrical tube 22 by carriage bolts 59 which pass through the cylindrical portion 34. The carriage bolts are arranged so that the bolt heads engage the square holes 60, shown in FIG. 3.

An alternative embodiment bracket 64 is shown in FIGS. 9–12, where unessential holes have been eliminated and essential holes are shown in phantom view indicating that the precise position of the holes could be varied. Particularly the bolt holes 62 which connect a vertical upright cylindrical tube could be positioned anywhere which would attach the bracket 64 to a cylindrical tube.

It is understood that the invention is not limited to the particular construction and arrangement of parts herein illustrated and described, but embraces such modified forms thereof as come within the scope of the following claims.

We claim:

1. An apparatus for mounting equipment to a trailer hitch comprising:

a rectangular extension for mounting to a vehicle rear trailer hitch;

a right cylindrical tube, having a cylindrical circumference, the tube extending vertically upwardly and being adapted to support brackets for mounting bicycles or other sporting equipment, the tube being positioned rearwardly of the rectangular extension;

a bracket having a plane of symmetry, wherein the bracket has a cylindrical portion which is intersected only once by the plane of symmetry, the cylindrical portion wrapping at least 180 degrees and less then 360 degrees of the tube circumference of the right cylindrical tube, and the cylindrical portion having a first substantially triangular extension and a second substantially triangular extension arranged symmetrically about the plane of symmetry and forming therebetween a passage for the rectangular extension, and wherein the bracket is pivotably mounted to the rectangular extension by a first pin passing through the first substantially triangular extension, the rectangular extension, and the second substantially triangular extension, the pin being closely spaced from the cylindrical portion;

a first stop mounted to a lowermost portion of at least one of said substantially triangular extensions to limit the outward pivoting of the bracket on the rectangular extension to about 45 degrees; and a removable second pin releasably fixing the first and second substantially triangular extensions to the rectangular extension at a position spaced from the first pin.

2. The apparatus of claim 1 wherein the first pin is positioned frontwardly of the first stop.

3. The apparatus of claim 1 wherein the second pin is positioned frontwardly of the first pin.

4. The apparatus of claim 1 wherein the first stop is mounted to one of the two substantially triangular extensions, and a second stop is mounted to the other of the substantially triangular extensions, the first stop extending inwardly toward the second stop.

5. The apparatus of claim 1 wherein the bracket is formed of a single piece of formed sheet metal.

6. The apparatus of claim 1 further comprising a plurality of bolts which extend through the cylindrical portion of the bracket and the cylindrical tube, the bolts being spaced vertically from one another.

7. The apparatus of claim 1 wherein portions of the first substantially triangular extension define an opening aligned with portions of the second substantially triangular extension defining another opening, both of said openings being positioned above the rectangular extension.

8. A bracket for pivotably connecting a cylindrical tube for supporting bicycles to a rectangular tube which extends rearwardly from a vehicle, the bracket comprising:

an upwardly extending segment which defines a portion of a cylinder, the upwardly extending segment wrapping at least 180 degrees and less than 360 degrees of a cylinder, the upwardly extending segment having two frontwardly facing ends;

a first gusset which extends rearwardly from one of the two frontwardly facing ends;

a second gusset which extends rearwardly from the other of the two frontwardly facing ends, wherein the second gusset is spaced substantially parallel to the first gusset to define a space for receiving the rectangular tube therebetween;

portions of the first gusset and the second gusset which define aligned first pin holes positioned to receive a first pin extending through the rectangular tube, and to thereby permit the pivoting of the bracket on the rectangular tube about the first pin;

portions of the first gusset and the second gusset which define two sidewardly spaced and aligned second pin holes, the second pin holes being spaced frontwardly from the first pin holes to receive a removable second pin which extends through the rectangular tube to selectably fix the bracket to the rectangular tube or permit pivoting of the bracket about the first pin when the second pin is removed from the second pin holes; and a first pivot stop extending inwardly from the first gusset below and reward of the first pin hole in the first gusset, the first pivot stop serving to prevent excessive rearward pivoting of the bracket with respect to the rectangular tube.

9. The bracket of claim 8 wherein the first gusset is a substantially triangular segment, and the second gusset is a substantially triangular segment.

* * * * *

UNITED STATES PATENT AND TRADEMARK OFFICE
CERTIFICATE OF CORRECTION

PATENT NO. : 6,062,451
DATED : May 16, 2000
INVENTOR(S) : TODD W. LASSANSKE ET AL

It is certified that error appears in the above-identified patent and that said Letters Patent is hereby corrected as shown below:

Claim 8, column 6, line 11, delete "reward" and substitute therefor -- rearward --.

Signed and Sealed this

Seventeenth Day of April, 2001

Attest:

NICHOLAS P. GODICI

*Attesting Officer*     Acting Director of the United States Patent and Trademark Office